US010901768B1

(12) United States Patent
Mandadi et al.

(10) Patent No.: US 10,901,768 B1
(45) Date of Patent: Jan. 26, 2021

(54) MIGRATING SERVERS FROM USER NETWORKS TO A USER-SELECTED TYPE OF HYPERVISOR AT A SERVICE PROVIDER NETWORK

(71) Applicant: Amazon Technologies, Inc., Seattle, WA (US)

(72) Inventors: Vijay Dheeraj Reddy Mandadi, Fremont, CA (US); Nagaraju Shiramshetti, Santa Clara, CA (US); Gunja Agrawal, Mountain View, CA (US); Rahul Sharma, Mountain View, CA (US); Venkata Keerthana Atchutuni, Sunnyvale, CA (US); Jordan Barry Brest, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 230 days.

(21) Appl. No.: 15/934,814

(22) Filed: Mar. 23, 2018

(51) Int. Cl.
   *G06F 9/455* (2018.01)
   *H04L 29/08* (2006.01)
   *H04L 12/24* (2006.01)
   *G06F 16/27* (2019.01)

(52) U.S. Cl.
   CPC .......... *G06F 9/45558* (2013.01); *G06F 16/27* (2019.01); *H04L 41/0813* (2013.01); *H04L 67/1095* (2013.01); *H04L 67/34* (2013.01); *G06F 2009/4557* (2013.01); *G06F 2009/45562* (2013.01); *G06F 2009/45583* (2013.01); *G06F 2009/45595* (2013.01)

(58) Field of Classification Search
   CPC ........ G06F 9/45558; G06F 2009/4557; G06F 2009/45562; G06F 2009/45583; G06F 2009/45595; H04L 41/0813; H04L 41/084; H04L 41/0846; H04L 67/1095; H04L 67/34
   See application file for complete search history.

(56) References Cited

U.S. PATENT DOCUMENTS

| 9,672,060 | B2* | 6/2017 | Behere | G06F 9/45558 |
| 9,836,476 | B2* | 12/2017 | Vijayan | H04L 67/1095 |
| 2007/0233698 | A1* | 10/2007 | Sundar | G06F 8/60 |
| 2010/0235831 | A1* | 9/2010 | Dittmer | G06F 9/45558 |
| | | | | 718/1 |

(Continued)

*Primary Examiner* — Emerson C Puente
*Assistant Examiner* — Zhi Chen
(74) *Attorney, Agent, or Firm* — Nicholson De Vos Webster & Elliott LLP

(57) ABSTRACT

Techniques for migrating servers from customer networks into service provider networks are described. A backup proxy can be deployed in a customer's network and associated with one or more servers in the customer's network and with a server migration service of a service provider network. A customer can identify a server in the customer's network to migrate and the server migration service coordinates the migration with the backup proxy. The backup proxy can be instructed to obtain replication data for the server, obtain configuration data associated with the server, and upload the replication data and configuration data to the service provider network. The service provider network uses the replication data and configuration data to create a migrated copy of the server at the service provider network.

20 Claims, 7 Drawing Sheets

(56) References Cited

U.S. PATENT DOCUMENTS

| | | | | |
|---|---|---|---|---|
| 2011/0252135 A1* | 10/2011 | Kudo | ............... | G06F 9/5044 709/224 |
| 2012/0233611 A1* | 9/2012 | Voccio | ............... | G06F 9/461 718/1 |
| 2013/0227335 A1* | 8/2013 | Dake | ............... | G06F 11/0793 714/4.2 |
| 2014/0143389 A1* | 5/2014 | Lagergren | ............ | G06F 9/45558 709/220 |
| 2015/0169292 A1* | 6/2015 | Shimada | ............. | G06F 9/448 717/115 |
| 2015/0301850 A1* | 10/2015 | Jeong | ............. | H04W 12/0602 718/1 |
| 2016/0170781 A1* | 6/2016 | Liguori | ............. | G06F 9/45558 718/1 |
| 2016/0335108 A1* | 11/2016 | Ryu | ............... | G06F 9/45558 |
| 2017/0060628 A1* | 3/2017 | Tarasuk-Levin | .... | G06F 9/44505 |

\* cited by examiner

MIGRATING SERVERS FROM USER NETWORKS TO A USER-SELECTED TYPE OF HYPERVISOR AT A SERVICE PROVIDER NETWORK

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Figure 1:
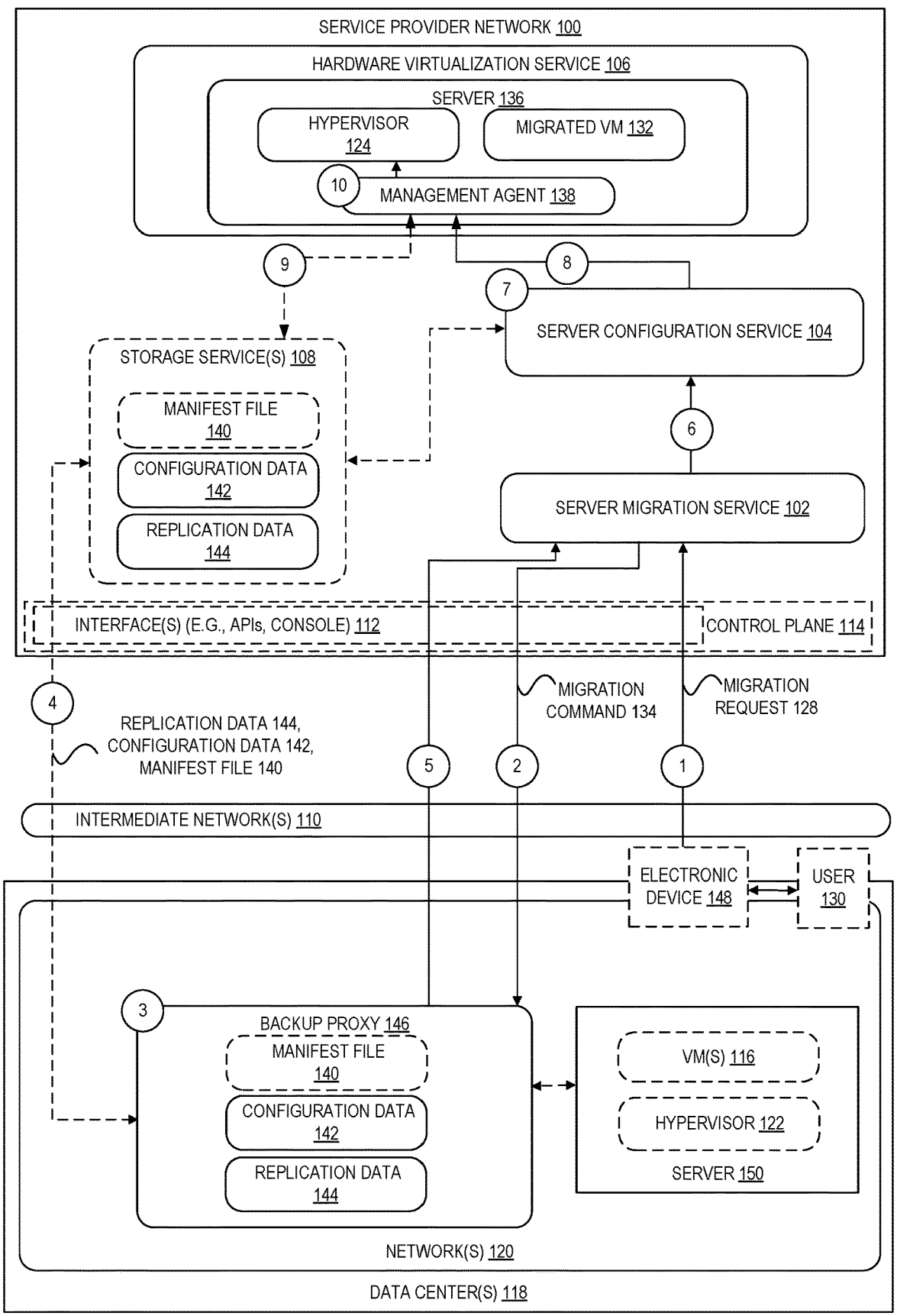
FIG. 1 is a diagram illustrating an environment for migrating virtual machines (VMs) located in a user's network to servers located in a service provider network running a user-selected type of hypervisor according to some embodiments.

Various embodiments of methods, apparatus, systems, and non-transitory computer-readable storage media are described for migrating users' virtual machines (VMs) from their on-premises environments to servers provided by a service provider network. According to embodiments described herein, users can migrate their VMs to servers at the service provider network running a user-selected type of hypervisor. In an embodiment, a service provider network includes a server migration service and a server configuration service that can be used to manage the migration of selected VMs to the service provider network (or from one server to another within the service provider network). In some embodiments, the service provider network further coordinates the server migration process using one or more "backup proxies" installed in a user's network. A backup proxy can be any type of software application—for example, a special purpose VM, an operating system agent, or a standalone application—that "connects" services of the service provider network with VMs or physical servers in a user's data center such that the services can indirectly interact with the VMs to perform migration-related operations.

In recent years, organizations have begun to realize the benefits of moving their computing resources, including servers, data storage, networks, and applications, out of their existing on-premises data centers and into systems managed by third-party service providers. These service providers typically provide a wide variety of configurable computing resources that can be provisioned and accessed over the internet, often using a "pay-as-you-go" or similar payment model. The ability to readily obtain such computing resources from these service providers eases many of the burdens that organizations face in managing on-premises data centers which tend to be expensive to maintain and frequently encounter scalability and resiliency issues.

A common type of computing resource offered by service providers is compute capacity, which is typically purchased by customers in the form of virtual computing resources, or VM instances. These VM instances, which are hosted by a service provider on physical computing devices with their own operating systems and other software components, can be used in much the same manner as physical computers. In some embodiments, a service provider network enables users to create and migrate VMs to service provider servers running a particular type of hypervisor supported by the service provider network. Users migrating their on-premises VMs to a service provider network thus typically are required to have their VMs converted to a format supported by the service provider. These users may further need to learn how to use new standards and procedures, VM and hypervisor management tools, and other aspects of the type of hypervisor supported by the service provider, which may differ from the tools used by the users in their on-premises environments for another type or version of hypervisor.

According to embodiments described herein, users can migrate VMs located in their on-premises environments into a service provider network "as is," that is, the VMs can be migrated to a server at the service provider network running the same hypervisor as that used in the customer's on-premises environment (or generally to any type of hypervisor of the user's choosing). In some embodiments, the ability to migrate a user's VMs to servers running a user-selected type of hypervisor is enabled in part by the availability of so-called "bare metal" servers at a service provider network. A bare metal server provides user instances with direct access to physical processors and memory of the underlying hardware of the server and can be dedicated to a single user. These bare metal servers, for example, may suited for workloads that rely on hardware virtualization features or that may be required to be run on physical servers to address compliance requirements or for other reasons.

In some embodiments, to perform a migration of a VM in a user's network to a service provider network, a server migration service of the service provider network instructs a backup proxy located in the user's network to obtain replication data (for example, one or more disk snapshots) for the server to be migrated. The server migration service further instructs the backup proxy to obtain configuration data related to the server to be migrated. The configuration data can include, for example, network settings, security settings, storage disk information, CPU and memory information, and so forth. In some embodiments, the backup proxy determines a type of hypervisor running in the user's network and that information can be used to automatically provision a bare metal server at the service provider network running a same type of type of hypervisor as that running in the user's network. The backup proxy sends, or uploads, the replication data and the configuration data to the service provider network. In other examples, a user can manually upload the replication data and configuration data to the service provider network.

Once the replication data and the configuration data is uploaded to the service provider network, the server migration service instructs a server configuration service to perform the migration, including launching the VM based on the replication data and configuring the VM based on the configuration data. In one embodiment, the server configuration service generates one or more installation scripts based on the type of hypervisor at the destination server that can be used to instruct the destination server to launch and configure a migrated copy of the VM that replicates the configuration of the server in the user's on-premises environment. The ability for users to migrate their VMs to a service provider network "as is" and without converting the VMs to a different format unless the user so desires enables users to more efficiently use their migrated VMs. Furthermore, users are not required to re-architect their applications to run on a particular type of hypervisor or to learn a different set of VM management tools.

FIG. 1 is a block diagram illustrating an environment for migrating servers (for example, VMs or physical servers) from a user's network to a service provider network according to some embodiments. In an embodiment, a server migration service 102, a server configuration service 104, a hardware virtualization service 106, and a storage service 108 operate as part of a service provider network 100 and each comprises one or more software modules executed by one or more electronic devices at one or more data centers and geographic locations.

A provider network 100 provides users with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage), network-related resources (for example, configuring virtual networks including groups of compute resources, content delivery networks (CDNs), Domain Name Service (DNS)), application resources (for example, databases, application build/deployment services), etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depend ending upon the context of use. Users may interact with a provider network 100 across one or more intermediate networks 110 (for example, the internet) via one or more interface(s) 112, such as through use of application programming interface (API) calls, via a console implemented as a website or application, etc. The interface(s) 112 may be part of, or serve as a front-end to, a control plane 114 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As indicated above, it has become desirable at times for customers to move servers (for example, one or more VMs 116) out of customer data centers 118 and into service provider networks such as the service provider network 100 (for example, to be run as one or more VMs) for any of a number of reasons including increased scalability and stability provided by the service provider network 100, reduced management and infrastructure costs, and so forth. Furthermore, it has become desirable at times for customers to move their VMs 116 to a destination server 136 at a service provider network 100 that is running a hypervisor 124 of the customer's choosing.

For example, FIG. 1 includes one or more customer networks 120 with one or more servers (for example, VMs 116) located within one or more data centers 118. VMs 116 typically run on a hypervisor 122, including a virtual machine monitor that provides an execution environment for the VMs on the host electronic device. In many environments, VMs 116 are independently or collectively managed using one or more VM management servers (not shown). For example, a VM management server may be configured to manage a group of VMs, such as some or all of the VMs executing within a data center 118. VM management servers provide a centralized system for managing the lifecycle of its managed VMs including the ability to start and stop VMs, create complete or incremental snapshots (or backups) of VMs, restore VMs, modify permissions, functionalities, and configurations of VMs, and so forth.

To perform migrations of on-premises servers to a service provider network 100, in some embodiments, a user can deploy and configure one or more backup proxies 146 in a customer network 120. A backup proxy 146, in some embodiments, is a software application (for example, a special purpose VM or a standalone application) that "connects" the server migration service 102 with the VMs 116 via one or more VM manager servers. The backup proxies 146 allow the server migration service 102 to indirectly perform migration-related operations on the VMs 116. As one example, a backup proxy 146 may be implemented by a FreeBSD VM in Open Virtualization Format (OVA) that can be downloaded from the service provider network 100. To deploy a backup proxy 146, a customer can install or execute the backup proxy on an electronic device (for example, a server device) that has connectivity within a customer network 120 to reach one or more VM management servers and the server migration service 102.

As indicated above, a backup proxy 146 acts as a local on-premises manager for certain operations of the migration process. For example, the backup proxy may provide one or more of the following functionalities related to the migration process: obtaining replication data (for example, disk snapshots) for VMs 116 via VM management servers, obtaining configuration data related to the VMs (for example, network configurations, security settings, CPU and memory information, and so forth), sending the replication data and the configuration data to the service provider network 100, and generating and uploading a manifest file indicating a storage location of the replication data and configuration data at the service provider network 100. In some embodiments, a customer configures a backup proxy 146 with credentials used to communicate with one or more VM management servers (for example, a vCenter Server™ by VMWare® or a System Center Virtual Machine Manager (SCVMM) by Microsoft®) in the customer networks as well as credentials used to communicate with the service provider network 100. In an embodiment, a user identifies which VMs 116 are desired for migration and the server migration service 102 can automatically assign migration operations to a backup proxy 146. In some embodiments, the server migration service 102 may send messages to a backup proxy 146 via a message service (for example, a message queuing service) or may "piggy-back" on health messages that the backup proxy 146 is configured to send.

In an embodiment, a console 112 is configured with user interface elements that allow a user 130 to initiate and optionally configure various aspects of a desired server migration, for example, to identify the VMs 116 to be migrated, to select a destination server for the migrated copy of the VM (for example, server 136 in FIG. 1), to indicate a type of hypervisor to run at the destination server (which may be explicitly indicated or inferred from the selection of the destination server), and so forth. A user can use a console 112 to initiate a server migration process by sending a migration request 128 to a server migration service 102 (as shown at the circle labeled "1" in FIG. 1). The migration request 128, for example, may include one or more of: identifier(s) of the one or more VMs the user 130 desires to migrate to the service provider network 100, an identifier of a destination server 136 to which the server is to be migrated, an identifier of a type of hypervisor 122 on which the server is running in the customer's network 120, and an identifier of a type of hypervisor 124 to be used at the destination server 136. For example, the user 130 may use an interface 112 (for example, a console) to acquire a list of VMs 116 that have been "registered" with the server migration service 102 (for example, via information sent from a backup proxy 146 to the server migration service 102 in association with the customer's account). The user 130 may then, for example, select one or more of these registered VMs 116 that are desired to be migrated and provide additional input indicating a desire for the selected servers to be migrated to a server running a type hypervisor of the customer's choosing (for example, by selecting a destination server 136 currently running the type of hypervisor or by identifying the desired type of hypervisor thereby causing the service provider network 100 to automatically provision a server running the identified type of hypervisor). As described above, in some embodiments, the identification of a desired type of hypervisor may be based on a backup proxy 146 identifying a type of hypervisor 122 running in the customer's network such that the service provider network 100 can automatically launch and configure a destination server running the same type of hypervisor. In an embodiment, the input causes the electronic device 148 to issue a migration request 128 (for example, an API call, a HyperText Markup Language (HTML) form submission, and so forth) identifying which of the VMs 116 are to be migrated.

In one embodiment, a server migration service 102 receiving a migration request 128 validates the request. For example, the server migration service 102 may validate the request to ensure that the selected destination server 136 has sufficient space to host the VM, that a hypervisor 124 is configured properly at the selected destination server 136, that the destination server 136 is associated with sufficient security permissions to perform configuration processes, and so forth. In one embodiment, the server migration service 102 may validate the request in part by sending information related to the request to the server configuration service 104, which can request validation information from a management agent 138 running on the destination server 136. In an embodiment, the management agent 138 is a software-based component that enables users and other services to remotely manage VMs at a server 136, among other operations. As described below, a management agent 138 creates and configures migrated copies of VMs at a server as part of the server migration process.

In an embodiment, at circle "2," in response to receiving the migration request 128, the server migration service 102 sends a migration command 134 to a backup proxy 146. In some embodiments, the sending of a migration command 134 uses, for example, a polling mechanism where a backup proxy 146 periodically checks with the server migration service 102 (for example, via a RESTful API call to an API endpoint) to determine whether there are new migration requests for the backup proxy and, in response, the server migration service 102 can send any pending migration commands 134. In other embodiments, "push" messaging techniques such as Web push, HTTP server push, long polling, and so forth, can be used to notify a backup proxy 146 of pending migration commands 134. A migration command 134, in some embodiments, identifies one or more operations that the recipient backup proxy 146 is to perform to facilitate the migration and an identifier of a VM 116 that the backup proxy 146 is to perform the operations relative to.

In an embodiment, a backup proxy 146 receiving a migration command 134 performs the assigned migration operations. The performance of the assigned operations can include sending commands to an associated VM management server (for example, to cause the VM management server to perform certain operations with respect to the VMs selected for migration) or possibly by interacting directly with the VMs to perform the operations. A variety of different operations may be performed by a backup proxy 146 in response to a migration command 134 such as, for example, validating a received migration command; creating a base (or "full") snapshot of the identified VM's disk(s), memory, or both; creating a delta or "incremental" snapshot; obtaining configuration data related to the identified VMs, such as configuration data related to a VM's name, networking configurations, IP addresses, security configurations, firewall rules, CPU, memory, and storage disk information, and so forth; creating a storage location (or "bucket") within the service provider network 100 (for example, using a storage service 108); uploading a base snapshot or a delta snapshot to the storage location; deleting artifacts that have been uploaded (for example, the snapshots and configuration data); consolidating a snapshot; creating and uploading a manifest file 140 identifying a storage location of uploaded snapshot(s) and configuration data, and so forth. In an embodiment, in cases where a VM 116 is associated with multiple storage disks, the manifest file can be used to identify which of the storage disks is the boot disk so that when the migrated copy of the VM is created at the destination server, the disks can be attached to the VM in the same order. In an embodiment, a storage service 108 can include various types of storage-related services which may be provided as a single service or as two or more separate services of a service provider network 100. For example, storage service(s) 108 can provide users access to general data object storage, block-level storage, data archival storage, among other possible types of storage services.

For example, in some embodiments, a backup proxy 146 performs part of a migration of a VM 116 by obtaining a full snapshot of the VM, obtaining configuration data associated with the VM, creating a data storage object (for example, a "bucket" or "folder") at a storage service 108, and uploading the snapshot and configuration data for storage in the data storage object. Similarly, if the migration command 134 is for a delta migration of a VM 116, the backup proxy 146 can obtain delta replication data (for example, a delta snapshot) of the VM (and updated configuration data if the configuration data has been updated) and upload the delta replication data and updated configuration data to the service provider network 100. In other embodiments, instead of or in addition to discrete snapshots, a backup proxy 146 can obtain a stream of data reflecting changes to a VM 116 and the streamed data can be uploaded to the service provider network 100 (either each time a change is detected or by batching the changes and periodically uploading the data). For example, an agent may be installed in the operating system (OS) of a physical server or an agent can interact with a hypervisor hosting a VM such that a filter driver streams information reflecting data written to a physical or virtual disk to the backup proxy 146.

At circle "3," for example, a backup proxy 146 obtains one or more snapshots and configuration data from a VM management server related to a VM 116 identified in the migration command 134. As another example, an I/O filter driver agent can be installed in the OS of a physical server 150 and used to capture a snapshot of the server that is obtained by the backup proxy 146. In other embodiments, OS-level disk snapshots can be obtained (for example, using a volume shadow copy service (VSS)) or a third-party storage array snapshot can be obtained. In some embodiments, the backup proxy 146 also obtains a snapshot and configuration data related to the hypervisor 122 running on the server 150. For example, the backup proxy 146 may cause the server 150 to generate a snapshot of the hypervisor 122 or the backup proxy may obtain a snapshot of the hypervisor 122 from a repository storing snapshots and other configuration data used to provision servers within the user's network 120. In an embodiment, an obtained hypervisor snapshot and associated configuration data can be used to launch a migrated copy of the hypervisor at a destination server 136 in the service provider network 100.

As indicated above, a backup proxy 146 collects configuration data 142 related to the configuration of a VM 116 in the customer's on-premises environment. In some embodiments, the operations performed by the backup proxy 146 to obtain the additional configuration data 142 may vary depending on the type of hypervisor 122 running the VM 116. For example, one type of hypervisor 122 might maintain and make a configuration file available upon request or it may be stored at a particular storage location (for example, a "*.vmcx" file if it the hypervisor 122 is a Hyper-V hypervisor). Other types of hypervisors 122 may provide an API that can be used to request configuration parameters and the backup proxy 146 may generate the configuration data 142 based on the collected parameters; still other type of hypervisors may be associated with a separate management application from which the configuration data can be obtained, and so forth.

At circle "4," a backup proxy 146 sends, or uploads, the replication data 144, configuration data 142, and optionally the manifest file 140 to a storage service 108 and, at circle "5," sends a message to the server migration service 102 indicating that the data is stored at the storage service 108. For example, the backup proxy 146 can upload the data to one or more buckets or folders created by the backup proxy 146 to store the data at the storage service 108 and, in return from the storage service 108, may receive one or more Uniform Resource Locators (URLs) or other identifier of the location(s) at which the data is stored. In some embodiments, the URL can be a "pre-signed" URL which grants time-limited permission to one or more other entities to access (for example, to download or copy) the data stored at the location identified by the pre-signed URL.

As indicated above, a server migration service 102 receives a message from a backup proxy 146 identifying the location at the storage service 108 at which the replication data 144, configuration data 142, and manifest file 140 is stored. At circle "6," in an embodiment, the server migration service 102 sends a migration command to the server configuration service 104 to perform the migration based on the data uploaded by the backup proxy 146. As described below, in response to the migration command, the server configuration service 104 performs operations including one or more of: generating a installation script or other types of instructions to be used by the destination server 136 to launch and configure a migrated copy of the VM 132, sending the installation script to a management agent 138 running on the destination server 136, monitoring the success or failure of the migration, and reporting the status of the migration to the server migration service 102. Although the server migration service 102 and the server configuration service 104 are shown as separate services of the service provider network 100 in FIG. 1, in some embodiments, the services may be part of a same service or may include other separate services.

In one embodiment, the server configuration service 104 provides an API including methods that facilitate the migration of VMs. For example, the server configuration service 104 may include a "createVM" method that can be used to launch a migrated copy of a user's VM on a selected destination server 136. This API method, for example, can be invoked by the server migration service 102 once the backup proxy 146 sends the message to the server migration service 102 indicating that the data is uploaded to the storage service 108. A "createVM" request may include, for example, one or more of the following parameters: a user's service provider account identifier, a pre-signed URL identifying a manifest file (which identifies a location of the replication data and configuration data), an identifier of the destination server 136, an identifier of the current migration job, and other possible information.

In some examples, a customer can use the server migration service 102 and server configuration service 104 without use of a backup proxy 146 (for example, because of security concerns or other reasons for not installing a backup proxy 146 in the customer's network 120). In this example, a user 130 may manually upload replication data 144 and configuration data 142 to a storage service 108 and send a request informing the server migration service 102 or server configuration service 104 of the storage locations.

In one embodiment, the server configuration service 104 stores data that is used to track the status of migration jobs. For example, the data may track, for each migration job, one or more of: an identifier of a customer account associated with the migration job, an identifier of the source VMs 116, an identifier of the destination server 136, a current status of the migration job, and so forth. This information may be used, for example, to report status information about particular migration job back to the server migration service 102 or other components.

In an embodiment, at circle "7," the server configuration service 104 generates an installation script and, at circle "8," sends the installation script to the management agent 138. In an embodiment, an installation script includes commands or other instructions related generally to launching and configuring a migrated copy of a VM at the destination server. For example, the commands may cause the management agent 138 to perform one or more of: downloading the replication data 144 and configuration data 142 from the storage service 108, sending commands to the hypervisor 124 running on the server 136, launching a migrated copy of the VM 132 running on the hypervisor 124, and configuring the migrated VM 132 according to the configuration data 142 (for example, by "replaying" the configuration settings included in the configuration data). In an embodiment, an installation script generated by the server configuration service 104 may include commands that are specific to the type of hypervisor 124 running at the destination server 136, and possibly depending on a version of the hypervisor 124. For example, the commands that the management agent 138 sends to the hypervisor 124 or other components on the server 136 may vary depending on the type of hypervisor (or type of application used to manage the hypervisor and VMs).

In one embodiment, the destination server 136 includes one or more offload cards (each including one or more processors, memory, and storage) that are connected using an I/O interface (for example, a bus implementing a version of the Peripheral Component Interconnect-Express (PCI-E) standard, or another interconnect such as a QuickPath interconnect (QPI) or UltraPath interconnect (UPI)). In some embodiments, the destination server 136 acts as a host electronic device (for example, operating as part of the hardware virtualization service 106) that hosts compute instances (for example, a migrated VM 132), and the one or more offload cards execute a virtualization manager that can manage compute instances that execute on the host electronic device. As an example, in some embodiments the offload card(s) can perform compute instance management operations such as pausing and/or un-pausing compute instances, launching and terminating compute instances, performing memory transfer/copying operations, and so forth. These management operations may, in some embodiments, be performed by the offload card(s) in coordination with a hypervisor 124 (for example, upon a request from a hypervisor) that is executed by the other processors of the computer system. However, in some embodiments the virtualization manager implemented by the offload card(s) can accommodate requests from other entities (for example, from compute instances themselves), and may not coordinate with any separate hypervisor.

For example, when a destination server 136 boots, an offload card of server 136 may configure the server, including booting an instance of the type of hypervisor 124 selected by the customer (for example, as indicated in the migration request 128 sent at circle "1"). In some embodiments, a control plane of the hardware virtualization service 106 can provide configuration information to the destination server 136 that is used by an offload card to identify a type of hypervisor 124 to load and a storage location of an image used to load the hypervisor. In one embodiment, an offload card loads a hypervisor 124 by attaching, via a network, a remote storage volume that stores the hypervisor (for example, using a separate storage virtualization service) to the server 136 and causes the hypervisor 124 to be loaded onto the server. After the hypervisor 124 is launched, the hypervisor can load a management agent 138, which can perform various operations related to the VM migration processes described herein.

As indicated above, in response to receiving a migration command from the server migration service 102, the server configuration service 104 generates an installation script that is sent to a management agent 138 running on the destination server 136. In an embodiment, a management agent 138 is used to perform operations identified in an installation script to launch and configure a migrated copy of the VM 132 at the destination server 136. In some embodiments, the management agent 138 may be packaged with a server 136 but may be selectively enabled or disabled by a customer.

In an embodiment, the management agent 138 performs operations to launch and configure a migrated copy of the VM 132 based on the installation script received from the server configuration service 104. For example, at circle "9," the management agent 138 obtains the replication data 144 and configuration data 142 from the storage service 108 and, at circle "10," launches the migrated copy of the VM 132 based on the replication data and configures the VM 132 according to the configuration data 142 collected from the on-premises environment. In an embodiment, the configuration of the migrated copy of the VM 132 can include one or more of: configuring the placement of disks associated with the VM 132, determining whether the hypervisor 124 is running in bridged mode and configuring the VM 132 accordingly, configuring network settings and security settings for the VM 132, and so forth.

As described above, a management agent 138 may obtain the replication data 144 from the storage service 108. In other embodiments, instead of the management agent 138 downloading the replication data 144 from the storage service 108 to the server 136, the server configuration service 104 (or a separate service) can create one or more remote storage volumes at the storage service 108 or at a separate storage virtualization service (for example, a block-based storage service) based on the replication data 144 that can be accessed by the migrated copy of the VM 132 (for example, by "attaching" the remote volume(s) to the migrated VM 132 over a network and using the attached volume(s) to boot the migrated VM 132). In this example, a migrated VM 132 could potentially be launched on multiple different servers, and possibly on different types of hypervisors, within the hardware virtualization service 106. In some embodiments, a hypervisor 124 running on the server 136 is also launched by the server 136 from a remote storage volume created at a storage virtualization service or other location.

In an embodiment, once the VM is launched and configured according to the replication data 144 and configuration data 142, the management agent 138 performs one or more validation steps to ensure that the migrated copy of the VM 132 is running properly. In an embodiment, once the migrated copy of the VM 132 is validated, the server configuration service 104 or server migration service 102 performs operations to notify the user 130 that the VM is successfully migrated (or that the migration failed in the case of errors). In one embodiment, the server migration service 102 may periodically poll the server configuration service 104 to determine the status of the migration job. For example, the server configuration service 104 may track which step of the installation script the management agent 138 is currently performing and can relay this status information to the server migration service 102. The possible statuses returned by the server configuration service 104 may include, for example, launching the VM, configuring the VM, performing post-configuration VM validation, VM successfully migrated, or errors encountered. In an embodiment, once the VM is launched and configured, the management agent 138 sends to the server configuration service 104 an identifier of the migrated VM 132, an IP address associated with the VM, among other possible identifiers; if the migration process failed, the management agent 138 sends a failure message to the server configuration service 104 that can be relayed to the server migration service 102.

The process described above illustrates an example of a user selecting a single on-premises VM 116 to migrate to the service provider network 100. In some embodiments, a customer can select multiple VMs 116 to migrate to the service provider network 100 as part of the same migration job. In this example, the server migration service 102 can parallelize many of the operations described above for migrating a single VM (for example, by sending multiple migration commands to one or more backup proxies 146, sending multiple create VM request to the server configuration service 104, and so forth).

In an embodiment, processes similar to those described above can be used to migrate incremental snapshots of a VM 116. For example, a user can indicate in the migration request 128 that the user desires for the VM 116 to be migrated more than once and can further indicate a replication frequency. In an embodiment, the server migration service 102 can obtain, in coordination with a backup proxy 146, delta snapshots of a VM 116 based on the indicated replication frequency and update a corresponding migrated copy of the VM accordingly.

As described above, a user 130 may migrate an on-premises VM 116 running on a particular type of hypervisor 122 to a server 136 at the service provider network running the same type of hypervisor 124, if desired. As indicated, this enables users to migrate VMs "as is" and to continue using the same management tools and processes as in their on-premises environments. However, there may be cases where a user 130 desires to migrate a VM 116 running on one type of hypervisor 122 in their on-premises environment to a different type of hypervisor 124 at the service provider network 100. A user may desire to migrate a VM across different hypervisors, for example, because of licensing costs or based on other preferences. In this example, the server configuration service 104 can generate an installation script for the desired destination hypervisor 124, even if that hypervisor is different from the user's local hypervisor 122.

In the examples above, a user 130 migrates in a VM 116 from their on-premises environment to a destination server 136 at the service provider network 100. In some embodiments, in addition to the ability to migrate individual VMs 116 to a service provider network 100, users can migrate in entire hosts, including both the user's hypervisor 122 and any guest VMs 116 running on the hypervisor. For example, a backup proxy 146 can package any VMs 116 and the hypervisor 122 together and move the entire package to a destination server 136 at the service provider network. In one embodiment, in response to a request from a user to migrate an entire server including a hypervisor and guest VMs, a backup proxy 146 or other component obtains block-level data for all the VMs and further obtains configuration information for the hypervisor 122 and VMs 116 from the operating system (OS) underlying the hypervisor 122. This information can be used to launch and configure both a migrated copy of the hypervisor 122 and VMs 116 at the service provider network 100.

Figure 2:
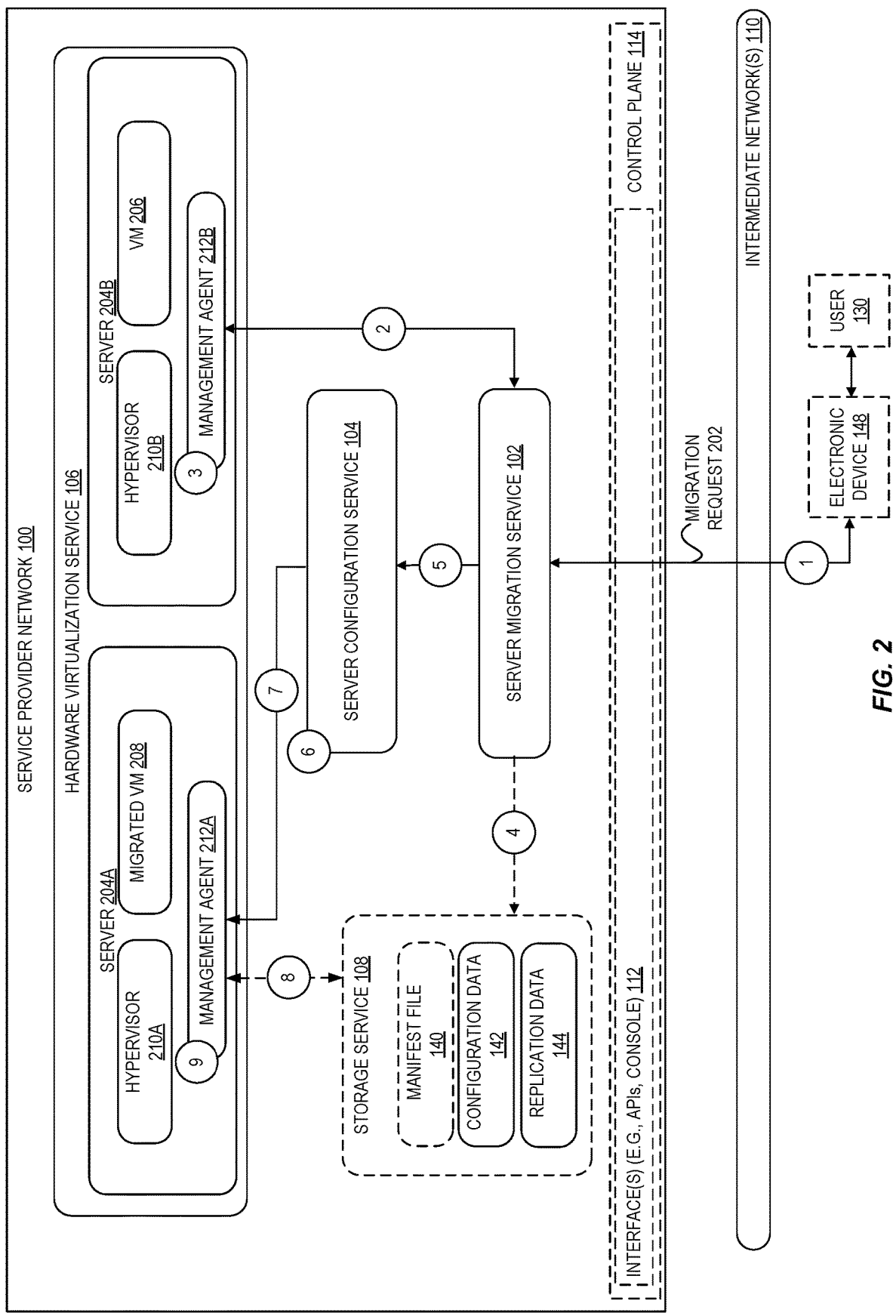
FIG. 2 is a diagram illustrating an environment for migrating VMs from one server to another within a service provider network according to some embodiments.

FIG. 2 is a block diagram illustrating an environment for migrating servers (for example, VMs or physical servers) from one server to another within a service provider network. Similar to FIG. 1, a server migration service 102, a server configuration service 104, a hardware virtualization service 106, and a storage service 108 operate as part of a service provider network 100 and each comprises one or more software modules executed by one or more electronic devices at one or more data centers and geographic locations.

In FIG. 2, a user 130 uses the console 112 to initiate and optionally configure various aspects of a desired server migration, for example, to identify a VM 206 at a server 204B to be migrated, to select a destination server for the migrated copy of the VM (for example, server 204A in FIG. 2), to indicate a type of hypervisor to run at the destination server (which may be explicitly indicated or inferred from the selection of the destination server 204A), and so forth. A user can use a console 112 to initiate a server migration process by sending a migration request 202 to the server migration service 102 (as shown at the circle labeled "1" in FIG. 2). The migration request 202, for example, may include one or more of: identifier(s) of the one or more VMs the user 130 desires to migrate from one server to another at the service provider network 100, an identifier of a destination server 204A to which the server is to be migrated, an identifier of a type of hypervisor 210B on which the server to be migrated is running, and an identifier of a type of hypervisor 210A to be used at the destination server 204A.

In one embodiment, a server migration service 102 receiving a migration request 202 validates the request. For example, the server migration service 102 may validate the request to ensure that the selected destination server 204A has sufficient space to host a migrated copy of the VM, that a hypervisor 210A is configured properly at the selected destination server 204A, that the destination server 204A is associated with sufficient security permissions to perform configuration processes, and so forth.

In an embodiment, at circle "2," in response to receiving the migration request 202, the server migration service 102 sends a migration command to a management agent 212B running on the source server 204B. In an embodiment, a management agent 212B receiving the migration command performs the assigned migration operations. The performance of the assigned operations can include sending commands to an associated hypervisor or possibly by interacting directly with the VMs to perform the operations. A variety of different operations may be performed by the management agent 212B in response to the migration command such as, for example, validating a received migration command; creating a base (or "full") snapshot of the identified VM's disk(s), memory, or both; creating a delta or "incremental" snapshot; obtaining configuration data related to the identified VMs, such as configuration data related to a VM's name, networking configurations, IP addresses, security configurations, firewall rules, CPU, memory, and storage disk information, and so forth; creating a storage location (or "bucket") within the service provider network 100 (for example, using a storage service 108); uploading a base snapshot or a delta snapshot to the storage location; deleting artifacts that have been uploaded (for example, the snapshots and configuration data); consolidating a snapshot; creating and uploading a manifest file 140 identifying a storage location of uploaded snapshot(s) and configuration data, and so forth. In an embodiment, in cases where a VM 116 is associated with multiple storage disks, the manifest file can be used to identify which of the storage disks is the boot disk so that when the migrated copy of the VM is created at the destination server, the disks can be attached to the VM in the same order.

At circle "3," for example, the management agent 212B obtains one or more snapshots and configuration data related to a VM 206 identified in the migration command. At circle "4," the server migration service 102 (or the management agent 212B) sends, or uploads, the replication data 144, configuration data 142, and optionally the manifest file 140 to a storage service 108. At circle "5," the server migration service 102 a message to the server configuration service 104 indicating that the data is stored at the storage service 108 and instructing the service 104 to perform the migration based on the uploaded data.

In an embodiment, at circle "6," the server configuration service 104 generates an installation script and, at circle "7," sends the installation script to the management agent 212A. In an embodiment, the installation script causes the management agent 212A to perform one or more of: downloading the replication data 144 and configuration data 142 from the storage service 108, sending commands to the hypervisor 124 running on the server 136, launching a migrated copy of the VM 132 running on the hypervisor 124, and configuring the migrated VM 132 according to the configuration data 142 (for example, by "replaying" the configuration settings included in the configuration data).

In an embodiment, the management agent 212A performs operations to launch and configure a migrated copy of the VM 208 based on the installation script received from the server configuration service 104. For example, at circle "8," the management agent 212A obtains the replication data 144 and configuration data 142 from the storage service 108 and, at circle "9," launches the migrated copy of the VM 208 based on the replication data and configures the VM 208 according to the configuration data 142 collected from the on-premises environment. In an embodiment, the configuration of the migrated copy of the VM 208 can include one or more of: configuring the placement of disks associated with the VM 208, determining whether the hypervisor 210A is running in bridged mode and configuring the VM 208 accordingly, configuring network settings and security settings for the migrated VM 208, and so forth.

Figure 3:
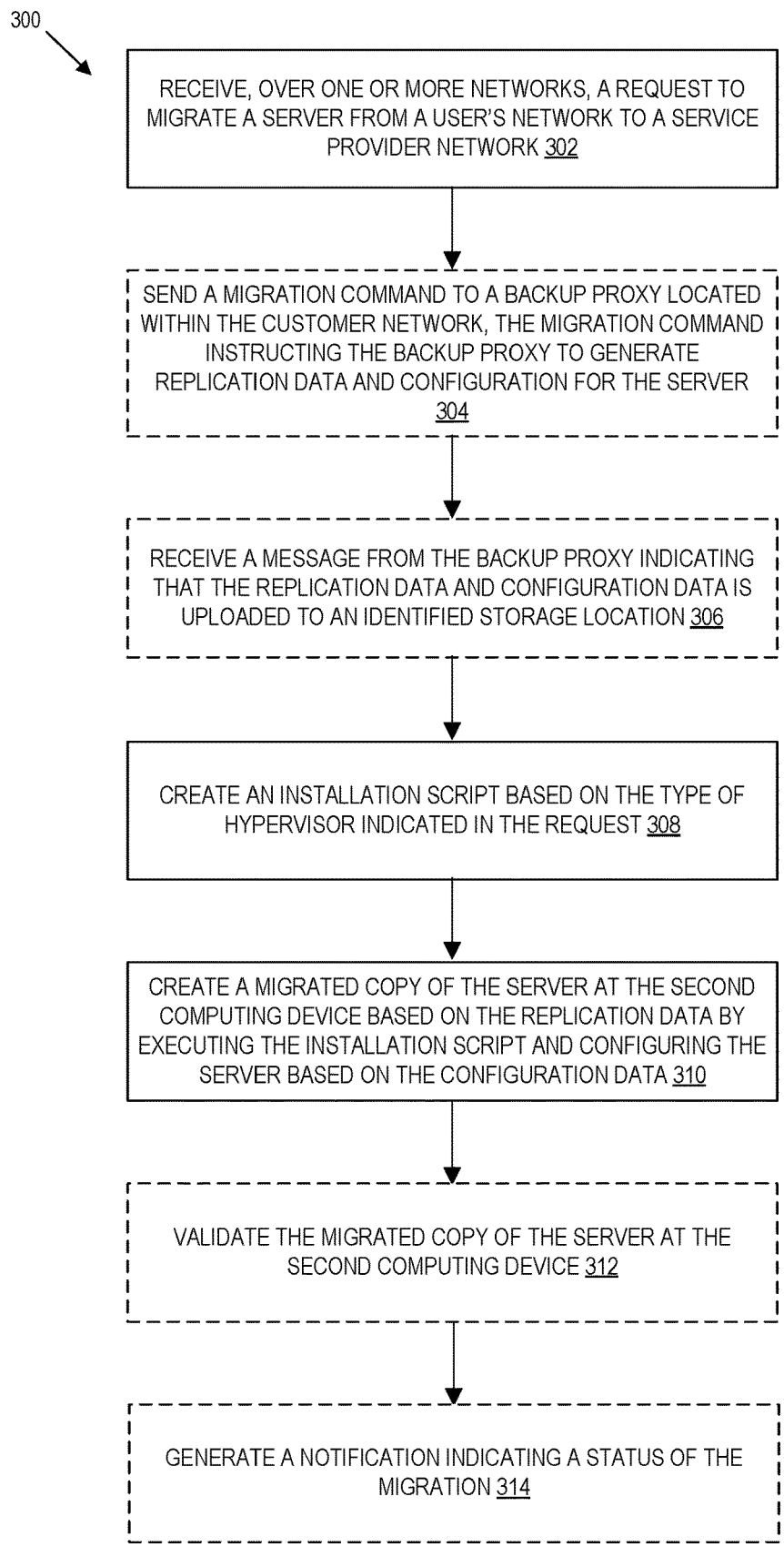
FIG. 3 is a flow diagram illustrating operations performed by components of a service provider network to migrate a VM located within a user's network to a service provider network according to some embodiments.
Figure 4:
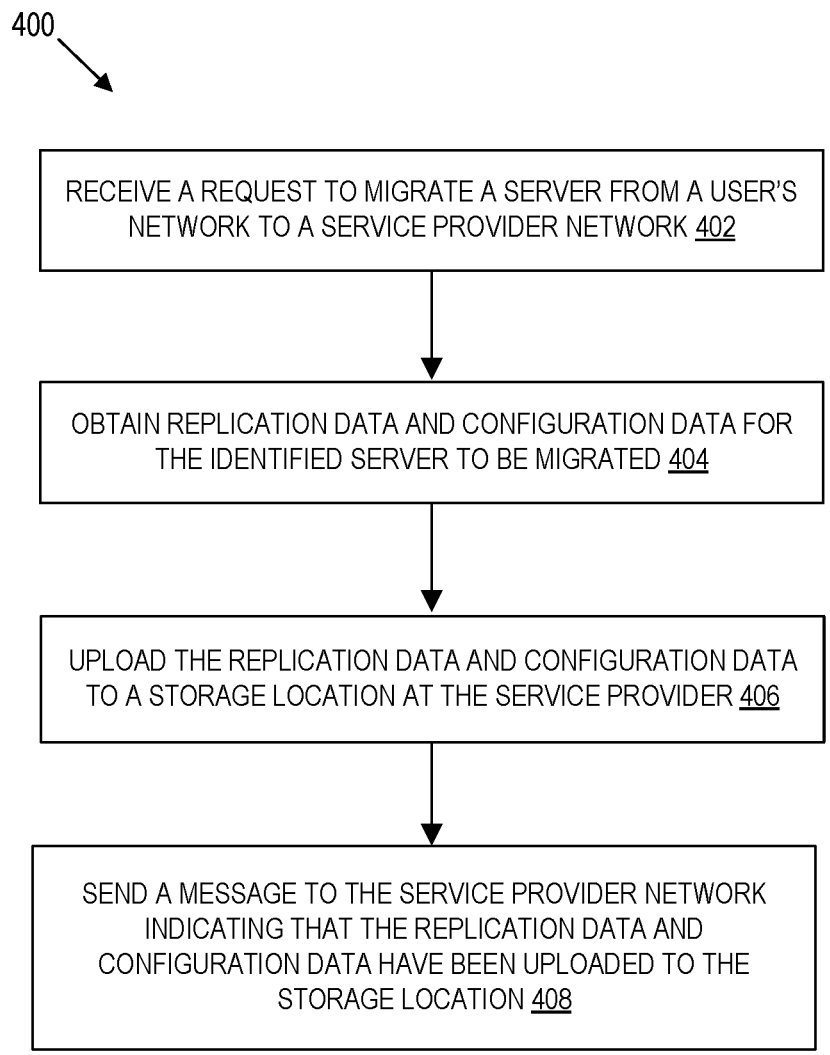
FIG. 4 is a flow diagram illustrating operations performed by a backup proxy located within a user's network to migrate a server located within the user's network to a service provider network according to some embodiments.

For further details, FIG. 3 and FIG. 4 are flow diagrams illustrating operations 300 and 400 for the migration of servers to a service provider network. Some or all of the operations 300 and 400 (or other processes described herein, or variations, or combinations thereof) are performed under the control of one or more computer systems configured with executable instructions and are implemented as code (for example, executable instructions, one or more computer programs, or one or more applications) executing collectively on one or more processors by hardware or combinations thereof. The code can be stored on a computer-readable storage medium, for example, in the form of a computer program comprising instructions executable by one or more processors. The computer-readable storage medium is non-transitory. In some embodiments, one or more (or all) of the operations 300 and 400 are performed by a server migration service 102, a server configuration service 104, a backup proxy 146, a management agent 138, and possibly other components of the other figures.

FIG. 3 is a flow diagram illustrating operations 300 performed by components of a service provider network to migrate VMs according to some embodiments. In some embodiments, the operations 300 include, at block 302, receiving, over one or more networks, a request to migrate a server (for example, a VM or a physical server) from a user's network to a service provider network. Referring again to FIG. 1, for example, a server migration service 102 may receive the request (for example, a migration request 128) in response to a user 130 using a console or other interface 112 to generate the request. In an embodiment, the request includes an identifier of the server (for example, an identifier of a VM or physical server 116) to be migrated, an indication of a type of hypervisor to be used to run a migrated copy of the VM at the service provider network (for example, either by explicitly identifying the type of hypervisor or by identifying a destination server 136 running the user's desired type of hypervisor) and, optionally, an identifier of a type of hypervisor 122 running in the user's environment. In an embodiment, the request is an HTTP request received at an API endpoint of the service provider network.

At block 304, optionally, a migration command is sent to a backup proxy located within the user's network, the migration command instructing the backup proxy to generate replication data and configuration data for the server to be migrated. For example, a server migration service 102 can send the migration command (for example, a migration command 134) to a backup proxy 146 and include with the request one or more of: an identifier of the VM or physical server 116 to be migrated.

Referring now to FIG. 4, operations 400 include operations performed by a backup proxy 146 in response to receiving the migration command (for example, a migration command 134). At block 402, the backup proxy receives the command to migrate the identified server. As described above, a backup proxy 146 may receive a migration command from a component of a service provider network 100 using either a push or pull mechanism. In an embodiment, the migration command includes an identifier of the server to be migrated.

At block 404, the backup proxy obtains replication data and configuration data for the identified server to be migrated. For example, a backup proxy 146 may obtain the replication data and configuration data from a VM management server (which generates the replication data for the identified VM 116), directly from the identified VM or physical server 116, or from any other source. The replication data can include, for example, disk snapshots, memory snapshots, or any other data to be used by a server migration service 102 and server configuration service 104 to create a migrated copy of the server at the service provider network. In an embodiment, the backup proxy 146 obtaining the replication data can include obtaining one or more of: a disk snapshot from a VM manager used to manage the identified server, a disk snapshot of a physical server corresponding to the identified server, a data stream reflecting changes to a disk associated with the identified server. In an embodiment, the configuration data can include networking configurations (for example, IP addresses), security configurations, CPU, memory, and storage disk information, and so forth.

At block 406, the backup proxy uploads the replication data and configuration data to a storage location at the service provider network. For example, the backup proxy 146 may create a folder, "bucket," or other type of storage location at a storage service 108 of the service provider network 100 and upload the replication data 144 and configuration data 142 to the created storage location (for example, using a URL or other identifier associated with the storage location). In an embodiment, the storage service 108 generates a pre-signed URL or other identifier of the storage location storing the uploaded data and sends the identifier to the backup proxy 146.

At block 408, the backup proxy sends a message to the service provider network indicating that the replication data and configuration data have been uploaded to the storage location. In an embodiment, the message includes an identifier of the storage location (for example, the URL or other identifier received from the storage service 108). Once a backup proxy 146 has uploaded replication data 144 and configuration data 142 to the storage location and informed the service provider network 100, the backup proxy 146 optionally can delete any artifacts of the replication data generation process (for example, obtained disk snapshot(s), replication data, and so forth). In other embodiments, the backup proxy 146 can locally store some or all of the generated replication data, for example, to use when generating "delta" snapshots of the server at a later time. In one embodiment, the backup proxy 146 can send the message informing the service provider network 100 of the uploaded replication data 144 and configuration data 142 using a message queueing service, API request, or any other type of messaging.

Returning to FIG. 3, at block 306, the server migration service receives the message from the backup proxy indicating that the replication data and configuration data have been uploaded to the identified storage location and, at block 308, creates an installation script based on the type of hypervisor to which the server is to be migrated.

At block 310, a management agent running at the second computing device creates a migrated copy of the server at the second computing device based on the replication data by executing the installation script and configuring the migrated copy of the server based on the configuration data. For example, a management agent 138 may execute an installation script created by the server configuration service 104 to create the migrated copy of the server. In an embodiment, creation of the migrated copy of the server may include one or more of: creating a storage volume, converting the replication data to a format for storage in one or more storage volumes to obtain the migrated copy of the server, storing the migrated copy of the server in the storage volume, injecting drivers into the storage volume, performing a test boot of the migrated copy of the server in the storage volume, creating a snapshot of the migrated copy of the server stored in the storage volume, creating a machine image of the migrated copy of the server based on the snapshot, storing the machine image at a storage location accessible to a customer account.

At block 312, the management agent optionally executes one or more validation scripts to validate that the migrated copy of the server, and optionally any applications that might be running on the server, are operating properly. In an embodiment, the scripts may include basic validation checks that are applicable to any migrations (for example, reachability tests and the like) and may also include custom validation checks that a user has created for the specific VM(s) being migrated. A user may provide, for example, a URL to a location storing the validation scripts or otherwise provide the validation scripts as part of the configuring the migration.

At block 314, the management agent generates a notification indicating a status of the migration. For example, the management agent 138 provides an indication of the migration status to the server configuration service 104, which in turn can provide the indication to the server migration service 102. The server migration service 102 can then report the status to the user 130 via the console 112 or other interface.

In some embodiments, a server migration service 102 can cause the generation of log data related to one or more of the operations described in relation to FIGS. 3 and 4. For example, a server migration service 102 may send requests to a logging/auditing service to generate log data related to one or more of: the server migration service 102 receiving the request at block 302, sending the migration command to the backup proxy at block 304, receiving the message from the backup proxy indicating that the replication data and configuration data are uploaded to the identified storage location at block 306, creating the installation script based on the type of hypervisor indicated in the request at block 308, creating a migrated copy of the server at the second computing device at block 310, and so forth. The generated log data can be associated with the customer account used to initiate the migration process so that the same user can inspect the log data (for example, via one or more interfaces 112 used to interact with a logging/auditing service(s)). In some embodiments, a backup proxy 146, storage service 108, server configuration service 104, management agent 138, and other components involved in the migration process can similarly generate log data related to operations performed by each of the components.

Figure 5:
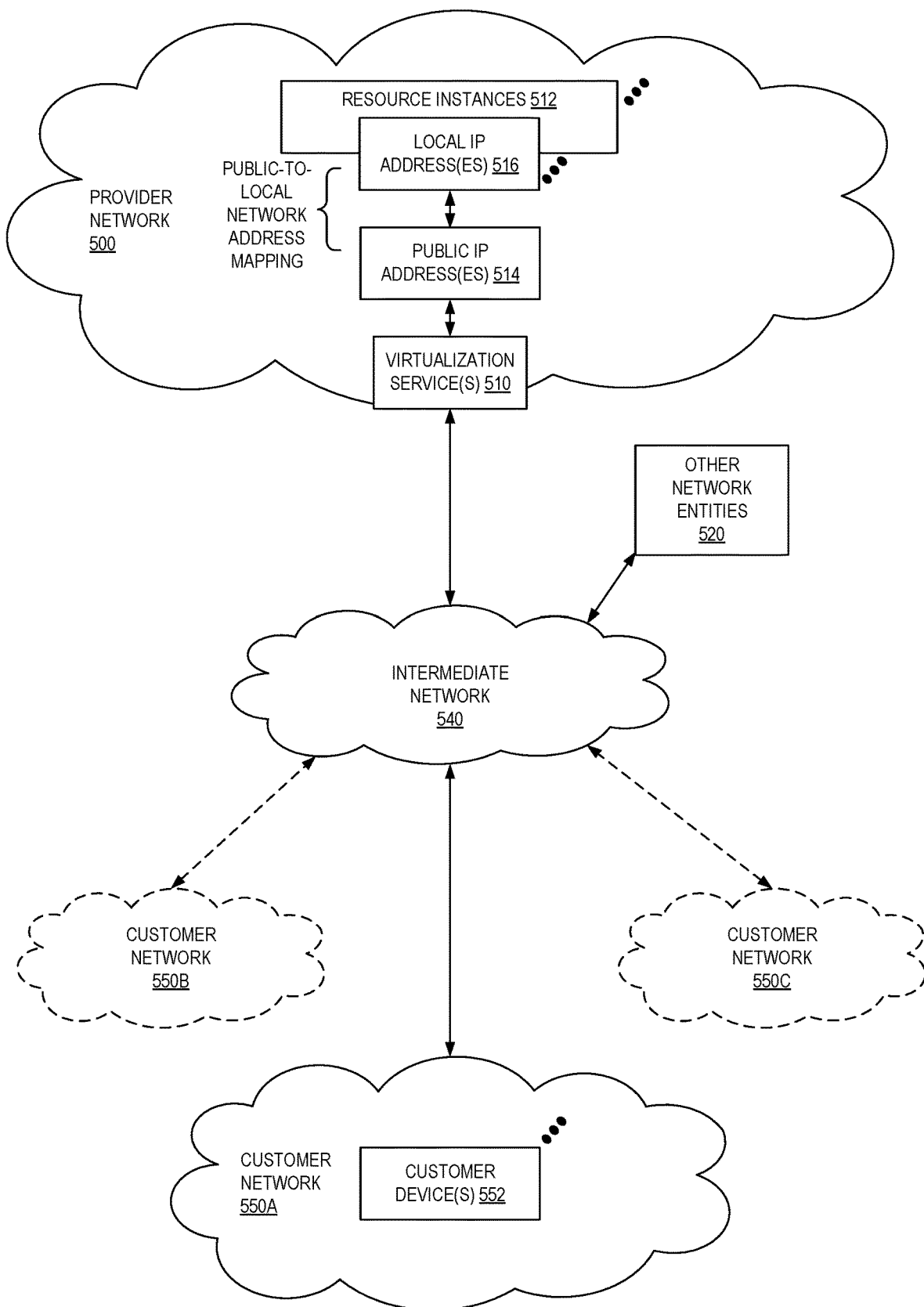
FIG. 5 illustrates an example provider network environment according to some embodiments.

FIG. 5 illustrates an example provider network (or "service provider system") environment according to some embodiments. A provider network 500 may provide resource virtualization to customers via one or more virtualization services 510 that allow customers to purchase, rent, or otherwise obtain instances 512 of virtualized resources, including but not limited to computation and storage resources, implemented on devices within the provider network or networks in one or more data centers. Local IP addresses 516 may be associated with the resource instances 512; the local IP addresses are the internal network addresses of the resource instances 512 on the provider network 500. In some embodiments, the provider network 500 may also provide public IP addresses 514 and/or public IP address ranges (for example, Internet Protocol version 4 (IPv4) or Internet Protocol version 6 (IPv6) addresses) that customers may obtain from the provider 500.

Conventionally, the provider network 500, via the virtualization services 510, may allow a customer of the service provider (for example, a customer that operates one or more client networks 550A-550C including one or more customer device(s) 552) to dynamically associate at least some public IP addresses 514 assigned or allocated to the customer with particular resource instances 512 assigned to the customer. The provider network 500 may also allow the customer to remap a public IP address 514, previously mapped to one virtualized computing resource instance 512 allocated to the customer, to another virtualized computing resource instance 512 that is also allocated to the customer. Using the virtualized computing resource instances 512 and public IP addresses 514 provided by the service provider, a customer of the service provider such as the operator of customer network(s) 550A-550C may, for example, implement customer-specific applications and present the customer's applications on an intermediate network 540, such as the Internet. Other network entities 520 on the intermediate network 540 may then generate traffic to a destination public IP address 514 published by the customer network(s) 550A-550C; the traffic is routed to the service provider data center, and at the data center is routed, via a network substrate, to the local IP address 516 of the virtualized computing resource instance 512 currently mapped to the destination public IP address 514. Similarly, response traffic from the virtualized computing resource instance 512 may be routed via the network substrate back onto the intermediate network 540 to the source entity 520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 500; a customer may then assign their allocated public IP addresses to particular resource instances allocated to the customer. These public IP addresses may be referred to as customer public IP addresses, or simply customer IP addresses. Instead of being assigned by the provider network 500 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 6:
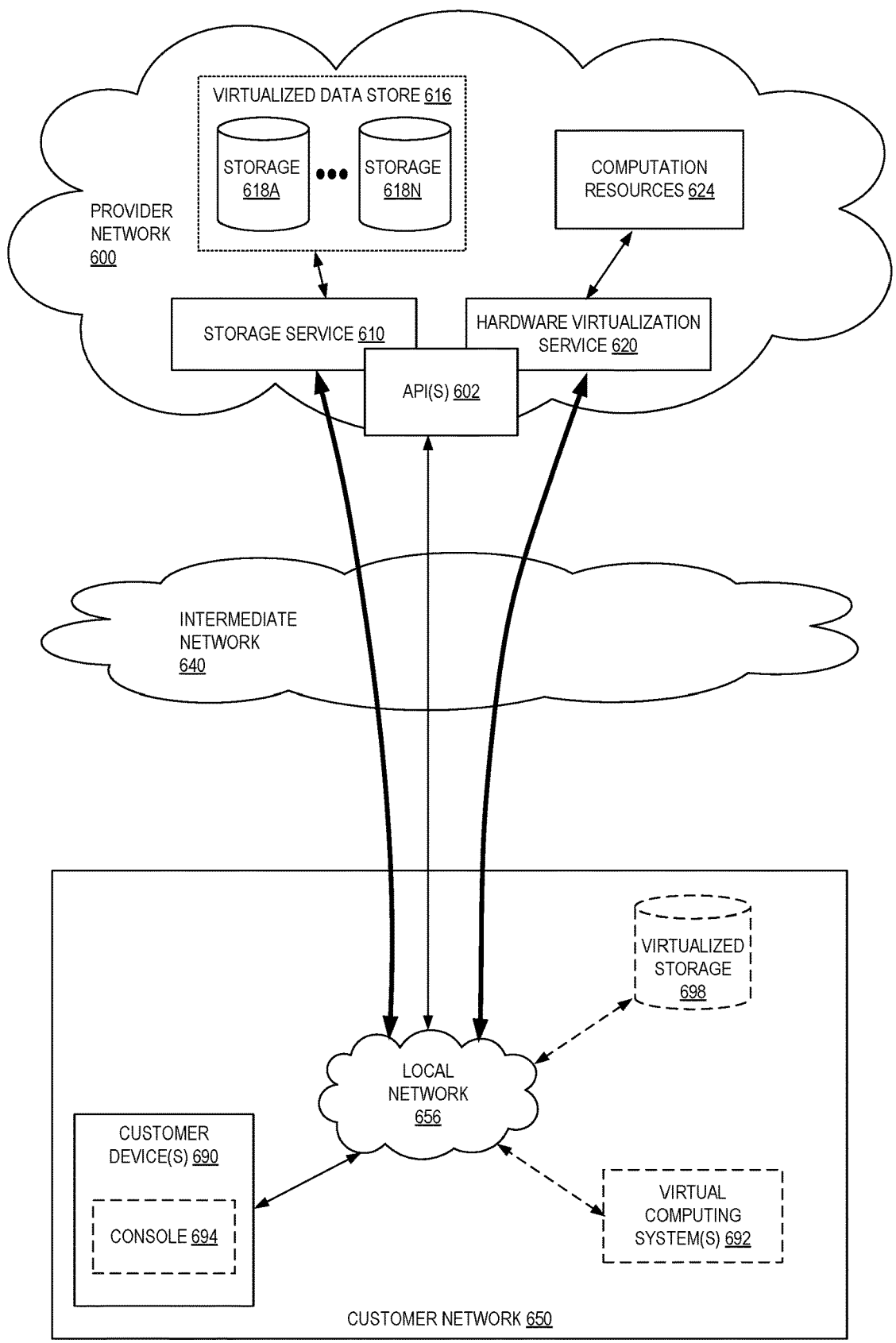
FIG. 6 is a block diagram of an example provider network that provides a storage virtualization service and a hardware virtualization service to customers according to some embodiments.

FIG. 6 is a block diagram of an example provider network that provides a storage virtualization service and a hardware virtualization service to customers, according to some embodiments. Hardware virtualization service 620 provides multiple computation resources 624 (for example, VMs) to customers. The computation resources 624 may, for example, be rented or leased to customers of the provider network 600 (for example, to a customer that implements customer network 650). Each computation resource 624 may be provided with one or more local IP addresses. Provider network 600 may be configured to route packets from the local IP addresses of the computation resources 624 to public Internet destinations, and from public Internet sources to the local IP addresses of computation resources 624.

Provider network 600 may provide a customer network 650, for example coupled to intermediate network 640 via local network 656, the ability to implement virtual computing systems 692 via hardware virtualization service 620 coupled to intermediate network 640 and to provider network 600. In some embodiments, hardware virtualization service 620 may provide one or more APIs 602, for example a web services interface, via which a customer network 650 may access functionality provided by the hardware virtualization service 620, for example via a console 694 (for example, a web-based application, standalone application, mobile application, etc.). In some embodiments, at the provider network 600, each virtual computing system 692 at customer network 650 may correspond to a computation resource 624 that is leased, rented, or otherwise provided to customer network 650.

From an instance of a virtual computing system 692 and/or another customer device 690 (for example, via console 694), the customer may access the functionality of storage service 610, for example via one or more APIs 602, to access data from and store data to storage resources 618A-618N of a virtual data store 616 provided by the provider network 600. In some embodiments, a virtualized data store gateway (not shown) may be provided at the customer network 650 that may locally cache at least some data, for example frequently accessed or critical data, and that may communicate with storage service 610 via one or more communications channels to upload new or modified data from a local cache so that the primary store of data (virtualized data store 616) is maintained. In some embodiments, a user, via a virtual computing system 692 and/or on another customer device 690, may mount and access virtual data store 616 volumes, which appear to the user as local virtualized storage 698.

While not shown in FIG. 6, the virtualization service(s) may also be accessed from resource instances within the provider network 600 via API(s) 602. For example, a customer, appliance service provider, or other entity may access a virtualization service from within a respective virtual network on the provider network 600 via an API 602 to request allocation of one or more resource instances within the virtual network or within another virtual network.

Illustrative System

Figure 7:
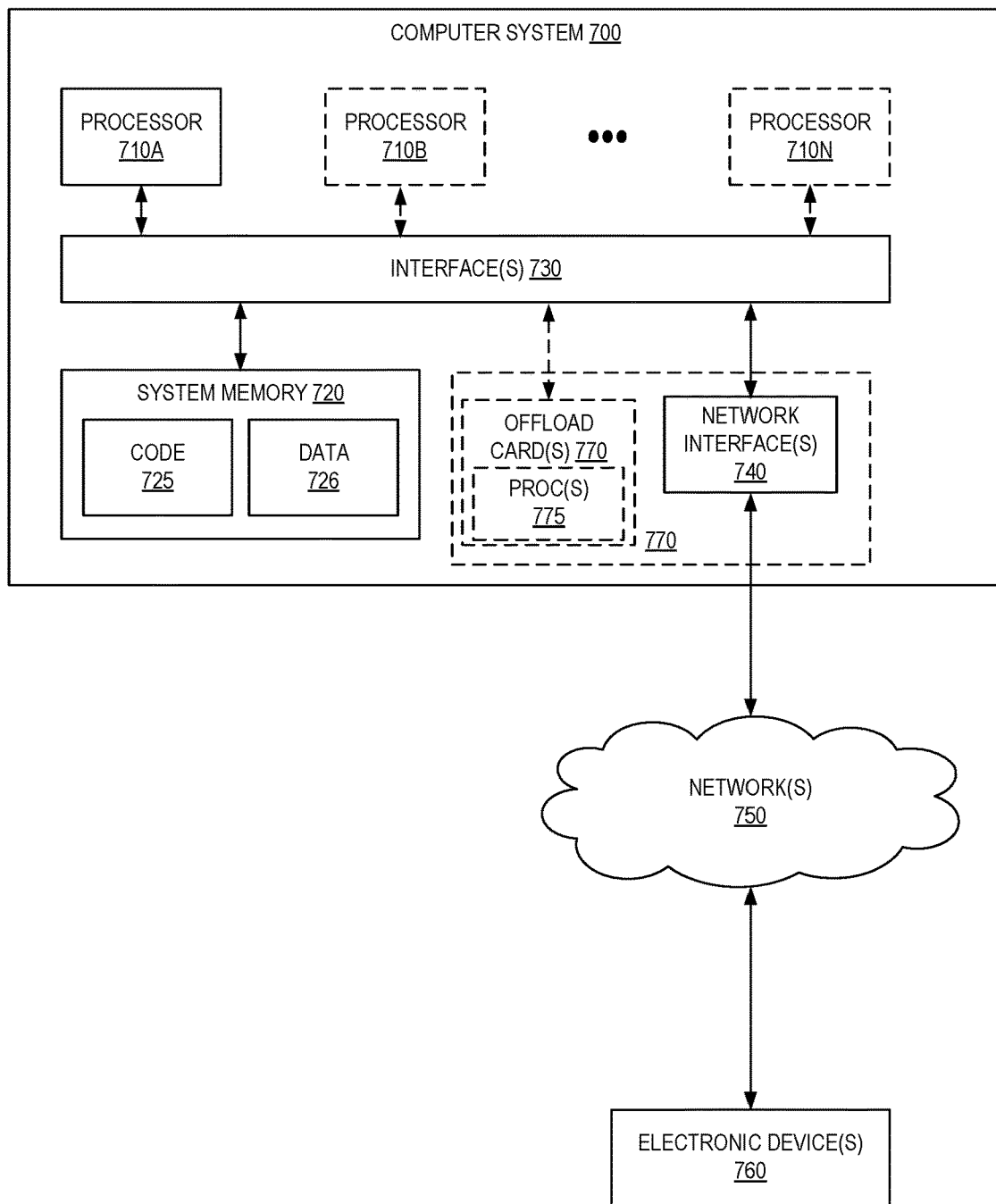
FIG. 7 is a block diagram illustrating an example computer system that may be used in some embodiments.

In some embodiments, a system that implements a portion or all of the techniques for migrating servers to a service provider system as described herein may include a general-purpose computer system that includes or is configured to access one or more computer-accessible media, such as computer system 700 illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (for example, two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 710 may commonly, but not necessarily, implement the same ISA.

System memory 720 may store instructions and data accessible by processor(s) 710. In various embodiments, system memory 720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (for example, system memory 720) into a format suitable for use by another component (for example, processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIG. 1, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 700 includes one or more offload cards 770 (including one or more processors 775, and possibly including the one or more network interfaces 740) that are connected using an I/O interface 730 (for example, a bus implementing a version of the Peripheral Component Interconnect-Express (PCI-E) standard, or another interconnect such as a QuickPath interconnect (QPI) or UltraPath interconnect (UPI)). For example, in some embodiments the computer system 700 may act as a host electronic device (for example, operating as part of a hardware virtualization service) that hosts compute instances, and the one or more offload cards 770 execute a virtualization manager that can manage compute instances that execute on the host electronic device. As an example, in some embodiments the offload card(s) 770 can perform compute instance management operations such as pausing and/or un-pausing compute instances, launching and terminating compute instances, performing memory transfer/copying operations, etc. These management operations may, in some embodiments, be performed by the offload card(s) 770 in coordination with a hypervisor (for example, upon a request from a hypervisor) that is executed by the other processors 710A-710N of the computer system 700. However, in some embodiments the virtualization manager implemented by the offload card(s) 770 can accommodate requests from other entities (for example, from compute instances themselves), and may not coordinate with (or service) any separate hypervisor.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, for example, disk or DVD/CD coupled to computer system 700 via I/O interface 730. A non-transitory computer-accessible storage medium may also include any volatile or non-volatile media such as RAM (for example, SDRAM, double data rate (DDR) SDRAM, SRAM, etc.), read only memory (ROM), etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (for example, large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (for example, 102A-102N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (for example, A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving, over one or more networks, a request to migrate a virtual machine (VM) from a first computing device located in a user's network to a second computing device located in a service provider network, wherein the request includes an indication of a type of hypervisor to be used to run a migrated copy of the VM at the second computing device;
    obtaining replication data for the VM and configuration data indicating configuration settings of the VM at the first computing device;
    identifying, by the second computing device, a type of hypervisor to be launched at the second computing device based on the indication of the type of hypervisor in the request;
    obtaining, by the second computing device, a hypervisor image corresponding to the type of hypervisor, wherein the hypervisor image is located at a storage location that is remote from the second computing device;
    launching, at the second computing device at the service provider network, a desired type of destination hypervisor based on the obtained hypervisor image;
    creating an installation script based on the destination hypervisor; and
    creating the migrated copy of the VM at the second computing device based on the replication data by executing the installation script and configuring the VM based on the configuration data, wherein the migrated copy of the VM runs on the destination hypervisor.

2. The computer-implemented method of claim 1, wherein the installation script identifies operations to be performed by a management agent running on the second computing device and that are specific to the destination hypervisor.

3. The computer-implemented method of claim 1, wherein the destination hypervisor at the second computing device is a same type of hypervisor used to run the VM at the first computing device.

4. A computer-implemented method comprising:
    receiving, over one or more networks, a request to migrate a server from a first computing device to a second computing device located in a service provider network, wherein the request includes an indication of a type of hypervisor to be used to run a migrated copy of the server at the second computing device;
    obtaining replication data for the server and configuration data related to configuration of the server at the first computing device;
    identifying, by the second computing device, a type of hypervisor to be loaded based on the indication of the type of hypervisor in the request;
    obtaining, by the second computing device, a hypervisor image corresponding to the type of hypervisor, wherein the hypervisor image is located at a storage location that is remote from the second computing device;
    launching, at the second computing device at the service provider network, a desired type of destination hypervisor based on the obtained hypervisor image; and
    creating the migrated copy of the server at the second computing device based on the replication data and the configuration data, the migrated copy of the server is running on the destination hypervisor.

5. The computer-implemented method of claim 4, further comprising:
    creating an installation script based at least in part on the destination hypervisor; and
    sending the installation script to a management agent running on the second computing device, wherein the installation script includes operations performed by the management agent to create the migrated copy of the server and that are specific to the destination hypervisor.

6. The computer-implemented method of claim 4, wherein the destination hypervisor at the second computing device is a same type of hypervisor used to run the server at the first computing device.

7. The computer-implemented method of claim 4, wherein the destination hypervisor at the second computing device is a different type of hypervisor from a hypervisor used to run the server at the first computing device.

8. The computer-implemented method of claim 4, wherein the replication data includes one or more of: a disk snapshot, a memory snapshot, or a machine image.

9. The computer-implemented method of claim 4, wherein creating the migrated copy of the server at the service provider network comprises one or more of:
creating a storage volume,
converting the replication data to a format for storage in one or more storage volumes to obtain the migrated copy of the server,
storing the migrated copy of the server in the storage volume,
injecting drivers into the storage volume,
performing a test boot of the migrated copy of the server stored in the storage volume,
creating a snapshot of the migrated copy of the server stored in the storage volume,
creating a machine image of the migrated copy of the server based on the snapshot, and
storing the machine image at a storage location accessible to a customer account.

10. The computer-implemented method of claim 4, further comprising:
obtaining delta replication data for the server and updated configuration data indicating settings of the server at the first computing device; and
using the delta replication data and the updated configuration data to update the migrated copy of the server at the second computing device.

11. The computer-implemented method of claim 4, further comprising:
wherein the obtained hypervisor image is a snapshot of a hypervisor running the server at the first computing device; and
wherein the destination hypervisor is a migrated copy of the hypervisor at the first computing device.

12. The computer-implemented method of claim 4, further comprising generating log data related to one or more of: receiving the request to migrate the server, sending a request to a backup proxy located within a user network to generate the replication data and the configuration data, obtaining the replication data and the configuration data, and creating the migrated copy of the server at the second computing device.

13. The computer-implemented method of claim 4, further comprising validating the request at least in part by determining whether the second computing device has sufficient space to run the server.

14. The computer-implemented method of claim 4, wherein the replication data for the server and configuration data related to configuration of the server at the first computing device is obtained from a backup proxy installed in a user's network.

15. A system comprising:
a server migration service implemented by one or more electronic devices, the server migration service comprising instructions which, when executed by the one or more electronic devices, cause the server migration service to:
receive, over one or more networks, a first request to migrate a virtual machine (VM) from a first computing device located in a user's network to a second computing device located in a service provider network, wherein the first request includes an indication of a type of hypervisor to be used to run a migrated copy of the VM at the second computing device,
send, over one or more networks, a second request to a backup proxy located within a customer network instructing the backup proxy to obtain replication data for the VM and configuration data related to configuration of the VM at the first computing device,
create an installation script based on the type of hypervisor indicated in the first request, and
send the installation script to a management agent running on the second computing device; and
an offload card coupled to the second computing device, the offload card comprising instructions which, when executed by the second computing device, cause the offload card to:
identify a type of hypervisor to be launched at the second computing device based on the indication of the type of, hypervisor in the request,
obtain a hypervisor image corresponding to the type of hypervisor, wherein the hypervisor image is located at a storage location that is remote from the second computing device,
launch, at the second computing device, a designed type of destination hypervisor based on the obtained hypervisor image; and
the management agent implemented by the second computing device, the management agent comprising instructions which, when executed by the second computing device, cause the management agent to:
receive, from the server migration service, the installation script,
cause the second computing device to obtain the replication data and the configuration data, and
cause the second computing device to create the migrated copy of the VM at the second computing device based on the replication data by executing the installation script and configuring the migrated copy of the VM based on the configuration data, the migrated copy of the VM running on the destination hypervisor.

16. The system of claim 15, wherein the installation script includes operations performed by the management agent to create the migrated copy of the VM and that are specific to the destination hypervisor.

17. The system of claim 15, wherein the destination hypervisor at the second computing device is a same type of hypervisor used to run the VM at the first computing device.

18. The system of claim 15, wherein the destination hypervisor at the second computing device is a different type of hypervisor from a hypervisor used to run the VM at the first computing device.

19. The system of claim 15, wherein the replication data includes one or more of: a disk snapshot, a memory snapshot, a machine image.

20. The system of claim 15, wherein the backup proxy uploads the replication data and the configuration data to the service provider network.

* * * * *